United States Patent Office 3,534,051
Patented Oct. 13, 1970

3,534,051
SUBSTITUTED HETEROCYCLIC BASIC ESTERS OF
BIS-(PARA-CHLOROPHENOXY)ACETIC ACID
Rudolf G. Griot, 93 Cathedral Ave.,
Florham Park, N.J. 07932
No Drawing. Continuation-in-part of application Ser. No.
598,970, Dec. 5, 1966. This application Feb. 13, 1967,
Ser. No. 615,321
Int. Cl. C07d 29/24
U.S. Cl. 260—294.3                    2 Claims

ABSTRACT OF THE DISCLOSURE

The compounds are of the class of basic esters of bis-(p - chlorophenoxy)acetic acid, e.g., bis - (p - chlorophenoxy)acetic acid 1 - [β - (p-chlorophenoxy)ethyl]-4-piperidyl ester and which are useful as hypocholesteremic/hypolipemic agents.

This is a continuation-in-part of my copending application Ser. No. 598,970, filed December 5, 1966, which in turn is a continuation-in-part of my copending application Ser. No. 568,759, filed July 29, 1966, which in turn is a continuation-in-part of my copending application Serial No. 549,475, filed May 12, 1966 (each of the three-enumerated applications now abandoned).

This invention pertains to derivatives of acetic acid. In particular, the invention is directed to basic esters of bis-(p-chlorophenoxy)acetic acid. The basic esters of the present invention may be represented structurally as follows:

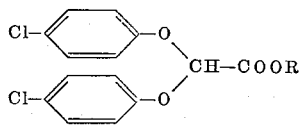

where R represents

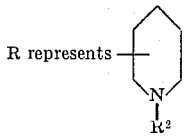

R² represents β-(p-chlorophenoxy)ethyl.

The above-noted compounds can be prepared by a one-step process which involves the reaction of either an alkyl ester of bis-(p-chlorophenoxy)acetic acid or a dialkyl ester of bis-(p-chlorophenoxy)malonic acid with an appropriate alcohol. Alternatively, the compounds may be prepared by converting bis-(p-chlorophenoxy)acetic acid to its corresponding acid halide and reacting the latter with an appropriate alcohol or alcoholate. These processes are illustrated by the following reaction scheme:

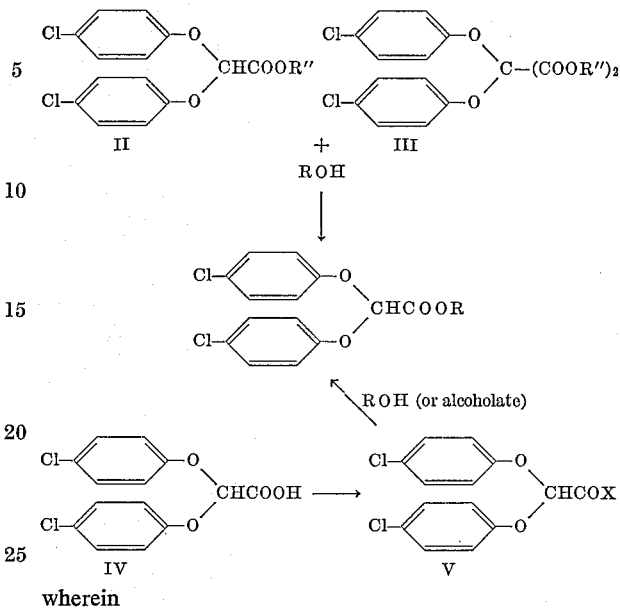

wherein

R is as previously defined;
R″ represents lower alkyl, preferably containing from 1 to 4 carbon atoms, e.g., methyl, ethyl, propyl and butyl; and
X represents chlorine or bromine.

The reaction of the mono- or di-alkyl ester (II or III) with the appropriate alcohol is carried out in a suitable inert organic solvent, e.g. benzene, toluene and xylene, and in the presence of an alkali metal alkoxide, such as sodium methoxide or sodium ethoxide. The reaction is conveniently effected at an elevated temperature, preferably the reflux temperature of the system. The desired product is readily recovered in conventional manner.

In the alternative process, bis-(p-chlorophenoxy)acetic acid (IV) is converted to the corresponding acid halide (V) by reaction with thionyl chloride or other suitable reagent commonly used for this purpose, e.g., thionyl bromide, phosphorus pentachloride and phosphorus pentabromide. The reaction is conveniently carried out in a suitable inert organic solvent and at room temperature (20° C.) or elevated temperatures up to reflux temperature of the system. However, the use of a solvent is not necessary since an excess of the halide reagent can be employed for this purpose. It is generally preferred to carry out the reaction in the presence of a catalytic amount of dimethylformamide. The reaction of the thus-obtained acid halide with the appropriate alcohol or alcoholate is conveniently effected in a suitable inert organic solvent, e.g. benzene, toluene, chloroform and diethyl ether, and at room tempertaure (20° C.) or below. The reaction, if desired, can be carried out at elevated temperatures; however, in such instances, external cooling should be provided since the reaction is highly exothermic. Preferably the reaction is carried out at a temperature of from about −10° to about 5° C. Where the free alcohol is employed it is desirable to provide a means for taking up the liberated hydrogen halide. This can be accomplished by employing an excess of the alcohol or by carrying out the reaction in the presence of an alkali metal carbonate, e.g., potassium carbonate, or suitable inert base, e.g. pyridine. Where an alcoholate is used, the alkali metal salts, particularly the sodium and potassium salts, are preferred. The desired product thus obtained is readily recovered in conventional manner.

The mono- and di-alkyl esters (II and III) employed as starting materials are readily prepared by reacting p-chloro-sodium phenolate (prepared from p-chlorophenol and sodium hydride) with a lower alkyl dichloroacetate or di-(lower) alkyl dibromomalonate, respectively. The reaction is readily carried out in a suitable inert organic solvent, e.g., dimethylacetamide, diethylacetamide and dimethylformamide, and at room temperature or elevated temperature (which should not exceed about 80° C. when it is desired to prepare the esters of Formula III).

The bis-(p-chlorophenoxy)acetic acid (IV), employed as the starting material for the alternative process described above, can be readily prepared in conventional manner from either the mono- or di-alkyl ester (II or III) by reacting the same in an aqueous, inert organic solvent, with a strong base, at room temperatures. The base is preferably one which will yield a water-soluble salt of the desired acid, e.g., sodium hydroxide and potassium hydroxide. The acid then is obtained by simply treating the thus-obtained salt with a mineral acid, such as hydrochloric acid, in conventional manner. The acid (IV) can also be prepared by decarboxylating the free malonic acid (III, R"=H) in conventional manner.

Many of the alcohols employed as starting materials are known and can be prepared as described in the literature. Such others which may not be specifically known can be prepared from available materials in analogous manner. The alcoholates can be prepared from the corresponding alcohols in conventional manner.

Certain of the compounds of Formula I have asymmetric centers and therefore exist as optical isomers. The respective isomers can be readily separated by conventional techniques or they can be selectively prepared employing the desired isomeric form of the alcohol reactant and accordingly are included within the scope of this invention.

The compounds of the present invention (Formula I) are useful because they possess pharmacological activity in animals. In particular, the compounds possess marked hypocholesteremic activity and can be used as hypocholesteremic/hypolipemic agents.

For such usage, the compounds may be admixed with conventional pharmaceutical carriers, and other adjuvants, if necessary, and administered orally in such forms as tablets, elixirs, suspensions or solutions. Furthermore the compounds may be similarly administered in the form of their non-toxic pharmaceutically acceptable acid addition or quaternary salts. Such salts do not materially differ from the free base in their pharmacological effects and are included within the scope of the invention. The acid addition salts are readily prepared by reacting the base with pharmacologically acceptable acids in conventional manner. Representative of such salts are the mineral acid salts such as the hydrochloride, hydrobromide, sulfate, phosphate and the like and the organic acid salts such as the benzoate, acetate, maleate, p-toluenesulfonate, benzenesulfonate and the like. Similarly, the quaternary salts are prepared by reacting the base with pharmacologically acceptable quaternizing agents in conventional manner. Exemplary of the quaternary salts are those derived from common quaternizing agents such as straight-chain lower alkyl halides wherein the lower alkyl group preferably contains from 1 to 4 carbon atoms and the halide substitutent is either chloride, bromide or iodide, e.g., methyl bromide, methyl chloride, ethyl bromide, methyl iodide and ethyl iodide, and straight-chain di-(lower) alkyl sulfates, e.g., dimethyl sulfate.

For the above-mentioned use, the dosage administered will, of course, vary depending on the compound employed. However, in general, satisfactory results are obtained when administered at a daily dosage of from about 4 milligrams to about 30 milligrams per kilogram of animal body weight, preferably given in divided doses, 2 to 4 times a day, or in sustained release form. For most mammals the administration of from about 0.25 gram to about 2 grams of the compound in divided doses of from about 62.5 milligrams to about 1000 milligrams 2 to 4 times a day, is adequate for the treatment of hypercholesteremia/hyperlipemia. A representative formulation suitable for oral administration is a tablet (prepared by standard tabletting techniques).

As noted hereinabove certain of the compounds of Formula I exist as optical isomers. In some instances, enhanced activity or other beneficial attribute may be found with respect to a particular isomer and in such instances administration of such isomer may be preferred.

The following example shows a representative compound contemplated by the present invention and the manner in which said compound is made. However, it is to be understood that the example is intended for the purpose of illustration only and is not intended as in any way limiting the scope of the invention.

EXAMPLE

Bis-(p-chlorophenoxy)acetic acid 1-[β-(p-chlorophenoxy)ethyl]-4-piperidyl ester

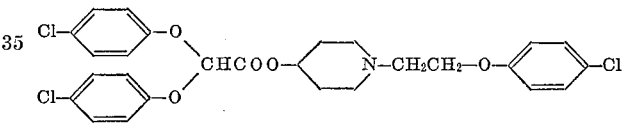

Step A. Preparation of 4-hydroxy-1-[β-(p-chlorophenoxy)ethyl]piperidine.—A mixture of 30.45 g. (0.3 mole) of 4-hydroxypiperidine, 20.6 g. (0.15 mole) of anhydrous potassium carbonate, 5 g. of potassium iodide and 300 ml. of methanol is heatde to reflux on a water bath and then treated with a solution of 35 g. (0.15 mole) of β-(p-chlorophenoxy)ethyl bromide in 100 ml. of methanol. The resulting mixture is then refluxed for 64 hours, filtered and the filtrate evaporated. To the solid residue thus obtained is added 100 ml. of petroleum ether. The resulting mixture is then filtered and the solid material suspended in 700 ml. of distilled water. The insoluble material is then filtered off, dissolved in 400 ml. of chloroform and the resulting solution dried over magnesium sulfate and evaporated. The residue is recrystallized from 250 ml. of hexane and 80 ml. of ethyl acetate and filtered, with the aid of charcoal, through Celite to obtain 4-hydroxy-1-[β-(p-chlorophenoxy)ethyl]piperidine, M.P. 111–112° C.

Step B. Preparation of bis-(p-chlorophenoxy)acetic acid 1-[β-(p-chlorophenoxy)ethyl]-4-piperidyl ester.—To a solution of 11.2 g. (0.0438 mole) of 4-hydroxy-1-[β-(p-chlorophenoxy)ethyl]piperidine in 1400 ml. of dry toluene is added 4.5 g. (0.044 mole) of triethylamine. The resulting mixture is stirred at room temperature and then there is added thereto, dropwise, a solution of 19 g. (0.057 mole) of bis-(p-chlorophenoxy)acetyl chloride in 50 ml. of toluene. The resulting mixture is then stirred overnight at room temperature, filtered and the filtrate extracted three times with 100 ml. (each) of cold 10% aqueous sodium bicarbonate solution and then washed three times with 100 ml. (each) of water and the organic phase evaporated to obtain bis-(p-chlorophenoxy)acetic acid 1-[β-(p-chlorophenoxy)ethyl]-4-piperidyl ester, M.P. 106.5–107° C.

What is claimed is:
1. A compound selected from the group consisting of compounds of the formula
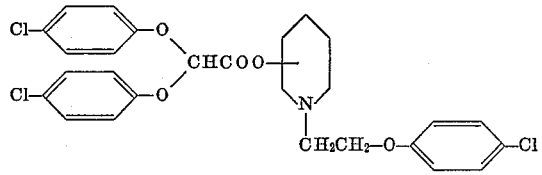
and the non-toxic acid addition and quaternary salts thereof.
2. The compound of claim 1 which is bis-(p-chlorophenoxy) acetic acid 1-[β-(p-chlorophenoxy)ethyl]-4-poperidyl ester.
No references cited.
ALEX MAZEL, Primary Examiner
J. TOVAR, Assistant Examiner
U.S. Cl. X.R.
260—293.4; 424—267